H. KLECKLER.
TAIL SKID CLIP.
APPLICATION FILED MAR. 22, 1917.

1,246,026.

Patented Nov. 6, 1917.

Inventor
HENRY KLECKLER.
Attorney

UNITED STATES PATENT OFFICE.

HENRY KLECKLER, OF BUFFALO, NEW YORK, ASSIGNOR TO CURTISS AEROPLANE AND MOTOR CORPORATION, A CORPORATION OF NEW YORK.

TAIL-SKID CLIP.

1,246,026.  Specification of Letters Patent.  Patented Nov. 6, 1917.

Original application filed January 13, 1916, Serial No. 71,892. Divided and this application filed March 22, 1917. Serial No. 156,601.

*To all whom it may concern:*

Be it known that I, HENRY KLECKLER, a citizen of the United States, residing at Buffalo, in the county of Erie and State of New York, have invented certain new and useful Improvements in Tail-Skid Clips, of which the following is a specification.

My invention relates to fittings for aeroplanes. The characteristic of this invention is set forth in an application filed January 13, 1916, Serial No. 71,892, of which this application is a division. As therein pointed out it is the aim and purpose of the invention to simplify and improve the details of construction of minor aeroplane parts.

The particular fittting or aeroplane part comprehended by the invention is the fitting referred to in the original application as the tail skid clip. The construction of the clip is such that the tail skid is not only fastened to the aeroplane body but that movement thereof may be effected in rectangularly opposed planes. This movement is especially desirable for the proper absorption of tail shocks incurred through side swipe incident to landing or to travel over rough or uneven ground. Moreover, the clip parts are interrelated and arranged for extreme compactness and strength and for quick and accurate assembly in the construction of a machine.

Of the drawings, wherein like characters of reference designate like or corresponding parts;

Figure 1:
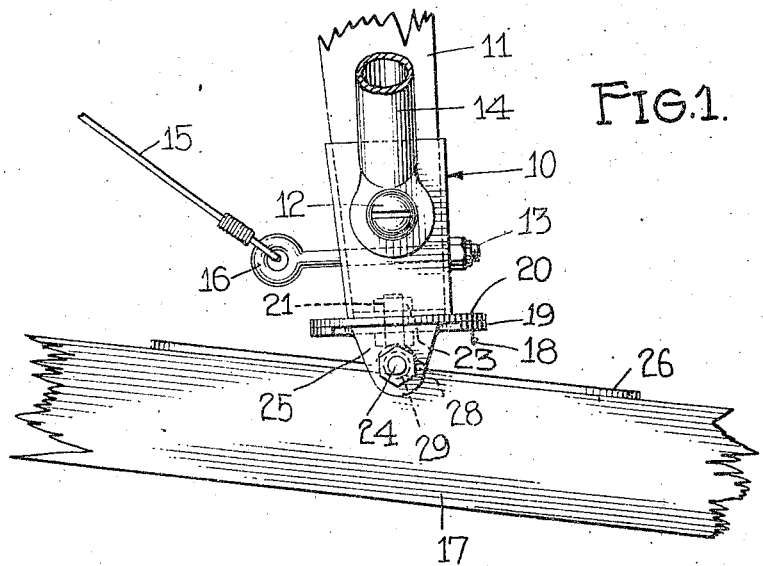
Figure 1 is a side elevation of the tail skid clip.

For the purpose of illustrating the application of the invention the socket member of the clip, designated in its entirety by the numeral 10, is shown as attached to the extended terminal of the stern post of the fuselage or body of an aeroplane (not shown). The fastening means for the socket member consists of bolts 12 and 13 passing transversely through the stern post 11 in intersecting planes, the bolts 12 conjointly functioning as a securing means for diagonally extending tubular braces 14 and the bolt 13 as a securing means for the stay 15; the braces 14 and the stay 15 likewise extending in intersecting planes. For the convenient fastening of the stay 15 the bolt 13 is equipped at one end with an eye 16 (see Fig. 1).

The tail skid or skid bar 17 (herein but partly shown) is mounted for pivotal movement in rectangularly opposed planes, the skid being fastened at its forward elevated end by any suitable elastic means to the fuselage or body of the craft. Intermediate its ends the tail skid is fastened or fulcrumed to the movable member of the tail skid clip, the socket member 10, by reason of its rigid connection to the stern post 11, being referred to hereinafter as the fixed member of the clip. Said movable member is designated in its entirety as 18 and comprises a bearing plate 19 having its top surface formed substantially complemental to the abutting underneath surface of the plate 20 which is fastened or made integral with the socket 10. These plates 19 and 20 are provided with alined holes through which the pivot pin or bolt 21 (Fig. 2) extends. A recess 22 is formed in the stern post 11 at its base to receive that portion of the bolt 21 penetrating the socket member 10 and extending upwardly therebeyond. The nut 23 for securing the bolt 21 in place is also inclosed within this recess.

Figure 2:
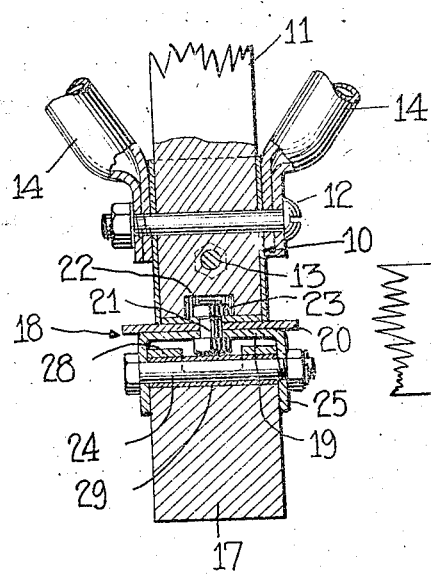
Fig. 2 is a section taken on a vertical plane through the center of the clip.
Figure 3:
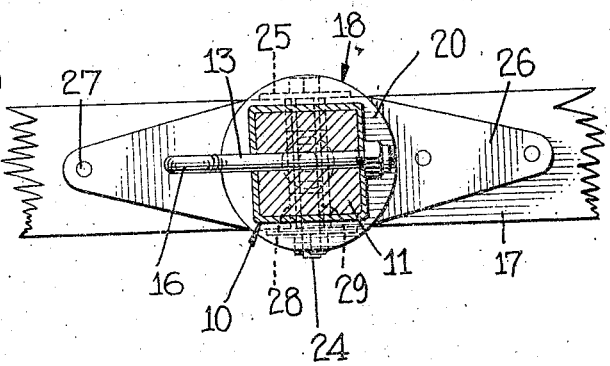
Fig. 3 is a section taken on a horizontal plane through the socket member of the clip.

The fastening means for the tail skid 17 also comprises a pivot pin or bolt 24. This bolt, however, acts as the skid bar fastening means without penetrating or piecing the skid. Ears 25, down-turned as illustrated in Fig. 2, are formed upon the plate 19 to overlap and receive between them the retaining plate 26 and a portion of the skid bar to which said plate 26 is rigidly secured as at 27. This plate 26 is somewhat elongated and as indicated in Fig. 4 is secured to the top surface of the skid 17. Intermediately said plate is offset to provide in effect a stirrup 28 substantially complemental to the pivot pin 24. A bearing sleeve 29 is arranged to embrace the said pin 24 and to terminally abut the ears 25. Said sleeve is designed to receive the wear and take up the friction incident to vertical displacement of the skid bar 17.

It is obvious that the skid bar may be moved in intersecting or rectangularly opposed planes. The pivot pin 24 acts as a fulcrum about which the bar 17 may be oscillated in a vertical plane and the pivot pin 21 as a pivot axis about which the bar may be moved in a vertical plane. A strong substantially universal mounting of this improved fuselage adjunct is thus evolved. The plates 19 and 20 take up the friction and wear incident to lateral displacement of the skid bar 7. Furthermore, quick assembly in the construction of an aeroplane is made possible by the inter-relation and coördination of these extremely simple clip parts. The pivot pin 21 being partly inclosed, as it is, head resistance, during flight through the air, is reduced.

Although the socket member 10 is shown as fastened to the stern post 11, no limitation in this respect is intended. The socket member may be fastened to any rigid element of the aeroplane body. Furthermore, the construction of the retaining plate and bearing member may be altered. Such modifications and changes are clearly within the spirit of the invention claimed and may be found essential in the adaptation of the clip to aeroplane bodies of different design.

What is claimed is:

1. A tail skid clip for aeroplanes including an element rigidly connected with the body of the craft, the underneath surface of said element affording a fixed bearing surface of substantial size, a movable member having a top surface similarly formed and in engagement with the bearing surface of said element, a loose connection between said element and said member, the connection being such that the surfaces are held in engagement with each other, and a loose connection between the movable member and the skid.

2. A tail skid clip for aeroplanes including a socket member having its under face constructed to provide a bearing surface, a securing plate for the tail skid having its top face constructed to provide a bearing surface, said surfaces being substantially complemental and in abutting engagement, a connection between said socket member and said plate, and a connection between said plate and said skid.

3. A tail skid clip for aeroplanes including a fixed bearing member constructed in socket form, the underneath surface of said member constituting a bearing surface, and a relatively movable bearing member having connection with the tail skid, said movable bearing member being likewise provided with a bearing surface for contact with the bearing surface of the fixed bearing member of the clip.

4. A tail skid clip for aeroplanes including an apertured bearing member rigidly connected with an element of the body of the craft, an apertured movable bearing member mounted for contact with said rigid bearing member, the relative positioning of the plates being such that the apertures coincide, a pivotal connection between the respective bearing members, connecting means extending through said apertures, and a pivotal connection between the movable bearing member and the tail skid, the pivotal connections together providing a means whereby said tail skid may be moved in different planes.

5. A tail skid clip for aeroplanes including a socket member constructed to receive an element of the body of the craft, said socket member having its under face constructed to provide a bearing surface, a securing plate having its top face constructed to provide a bearing surface substantially complemental to the bearing surface of said socket member, a loose connection between said securing plate and the tail skid, and a loose connection between the securing plate and the socket member, the respective connections being so arranged that movement of the tail skid may be effected in rectangularly opposed planes.

6. A tail skid clip for aeroplanes including a bearing member rigidly connected with an element of the body of the craft, a securing plate having one of its faces constructed to provide a bearing surface complemental to the engaging surface of said bearing member, a retaining plate rigid with the tail skid of the craft, a connection between said securing plate and said skid, said connection being arranged to underlie said retaining plate without penetrating the skid, and a connection between the bearing member and said securing plate, the connections together providing for movement of the tail skid in rectangularly opposed planes.

7. A tail skid clip for aeroplanes including a bearing member rigidly connected with an element of the body of the craft, a securing plate for the tail skid of the craft, a connection between the securing plate and said tail skid, and a connection between the securing plate and the bearing member, a portion of said last mentioned connection being completely inclosed in a recess formed in that portion of the body element to which the bearing member is attached.

8. A tail skid clip for aeroplanes including a fixed and a relatively movable bearing member, and connections respectively between the two members and between the movable bearing member and the tail skid, said last mentioned connection being arranged wholly upon the exterior of the skid.

In testimony whereof I hereunto affix my signature.

HENRY KLECKLER.